(12) United States Patent
Teramachi et al.

(10) Patent No.: US 7,451,955 B2
(45) Date of Patent: Nov. 18, 2008

(54) WALL-MOUNTING DEVICE

(75) Inventors: Akihiro Teramachi, Tokyo (JP); Kaoru Hoshide, Tokyo (JP); Kentaro Eto, Tokyo (JP)

(73) Assignee: THK Co., Ltd., Tokyo (JP)

( * ) Notice: Subject to any disclaimer, the term of this patent is extended or adjusted under 35 U.S.C. 154(b) by 10 days.

(21) Appl. No.: 10/572,564

(22) PCT Filed: Sep. 24, 2004

(86) PCT No.: PCT/JP2004/013901

§ 371 (c)(1),
(2), (4) Date: Mar. 17, 2006

(87) PCT Pub. No.: WO2005/031082

PCT Pub. Date: Apr. 7, 2005

(65) Prior Publication Data

US 2007/0051861 A1 Mar. 8, 2007

(30) Foreign Application Priority Data

Sep. 26, 2003 (JP) ............................. 2003-334973

(51) Int. Cl.
*A47B 96/00* (2006.01)
(52) U.S. Cl. ................................ 248/223.41; 248/298.1
(58) Field of Classification Search ............ 248/223.41, 248/225.11, 298.1, 476, 480, 224.57, 224.61; 384/44, 45

See application file for complete search history.

(56) References Cited

U.S. PATENT DOCUMENTS 6,131,866 A * 10/2000 Kesinger ............... 248/225.11
6,663,075 B2 * 12/2003 Zuller ..................... 248/476
6,685,355 B2 * 2/2004 Kuwahara ................ 384/45

FOREIGN PATENT DOCUMENTS

| JP | 58-11567 | 1/1983 |
|---|---|---|
| JP | 11567/1983 | 1/1983 |
| JP | 61-268215 | 11/1985 |
| JP | 61-106004 | 5/1986 |
| JP | 106004/1986 | 7/1986 |
| JP | 5-45123 | 6/1993 |
| JP | 45123/1993 | 6/1993 |
| JP | 8-226442 | 9/1996 |
| JP | 2001-252140 | 9/2001 |
| JP | 2002-155936 | 5/2002 |

OTHER PUBLICATIONS

International Search Report of PCT/JP2004/013901 mailed Dec. 7, 2004.

* cited by examiner

*Primary Examiner*—Ramon O Ramirez
(74) *Attorney, Agent, or Firm*—Westerman, Hattori, Daniels & Adrian, LLP.

(57) ABSTRACT

A wall-mounting structure allowing an object to be supported such as furniture or an electrical appliance to freely move on the wall surface and capable of preventing the aesthetic appearance of the wall surface from being impaired, including a mounting plate to which the object to be supported is fixed and slide support members for movably supporting the mounting plate on the wall surface, in which each of the slide support members is composed of a track rail which has a substantially rectangular section and ball rolling surfaces on the both side surfaces thereof, and moving blocks assembled with the track rail through a large number of balls.

3 Claims, 6 Drawing Sheets

WALL-MOUNTING DEVICE

TECHNICAL FIELD

The present invention relates to a wall-mounting structure capable of fixing an electrical appliance such as a TV set or speaker, painting, bookshelf or furniture on the wall surface of a room of a house or an office and moving it on the wall surface according to the circumstances.

BACKGROUND ART

Patent Document 1: JP 2001-252140 A

Heretofore, there has been known a wall-mounting structure for installing an article such as furniture or an electrical appliance (referred to as "object to be supported" hereinafter) on the wall surface and movably holding it on the wall surface as disclosed in JP 2002-252140 A. In this structure, a recess for receiving the object to be supported is formed in the wall surface and the object to be supported is accommodated in the recess without projecting from the wall surface. In the recess, portions of the wall surface opposed to the top surface and the bottom surface of the object to be supported are provided with rails in the moving direction of the object to be supported, and guide grooves for receiving the rails are formed in the top surface and the bottom surface of the object to be supported. Thus, the object to be supported can freely move on the wall surface in the recess.

DISCLOSURE OF THE INVENTION

Problems to be Solved by the Invention

However, in this wall-mounting structure in the prior art, the recess must be formed in the wall surface in consideration of the sliding space of the object to be supported. In forming the recess, the wall surface must be scraped off in consideration of the moving stroke of the object to be supported, so it is very troublesome to form the recess. The recess formed in the wall surface corresponds to the moving stroke of the object to be supported, and the above rails must be laid along the entire length of the recess. As a result, the rails in the recess are exposed inevitably, which disadvantageously results in imparting the aesthetic appearance from the viewpoint of interior decoration. Further, the grooves for receiving the rails must be formed in the object to be supported, and accordingly, the structure of the housing of the object to be supported is disadvantageously limited.

Means for Solving the Problems

It is an object of the present invention which has been made in view of the above problems to provide a wall-mounting structure capable of moving the object to be supported such as an electrical appliance or furniture to a desired position on the wall surface of a room and preventing the aesthetic appearance of the wall surface from being impaired.

The present invention, which achieves the above object, provides a wall-mounting structure for supporting an object to be supported on the wall surface of a room, including: a mounting plate to which an object to be supported is fixed; and slide support members for movably supporting the mounting plate on the wall surface, in which each of the slide support members is composed of a track rail and moving blocks which can move along the track rail.

In this wall-mounting structure, the number of track rails and the number of moving blocks of the slide support member can be suitably selected according to the weight and size of the object to be installed on the wall surface. However, in consideration of the postural stability of the object to be supported on the wall surface, it is preferred that the number of track rails should be 2 or more and the number of moving blocks to be assembled with the respective track rails should be 2 or more.

The above slide support member is composed of a track rail and moving blocks which move relative to each other. Either the track rail or the moving blocks may be coupled to a mounting plate or fixed on the wall surface. To make the moving distance of the object to be supported on the wall surface larger, it is preferred that the track rails should be fixed on the wall surface so that the moving blocks fixed to the mounting plate move along the track rails. On the other hand, in the case where the track rails are fixed on the wall surface and the moving blocks are fixed to the mounting plate, when the object to be supported moves towards one end of each of the track rails together with the mounting plate, the other end of each of the track rails are exposed, thereby deteriorating the aesthetic appearance from the viewpoint of interior decoration. Therefore, when placing emphasis on the aesthetic appearance, it is preferable to fix the moving blocks on the wall surface and the track rails on the mounting plate.

Further, as above slide support member, it is possible to suitably select one from existing linear guide devices having a track rail and moving blocks in cooperation, in consideration of the direction of a load applied to the slide support member by the object to be supported. It will be dangerous if the object to be supported installed on the wall surface drops due to vibration such as an earthquake. Accordingly, as the slide support member, one in which moving blocks bearing all the load applied in a direction perpendicular to the longitudinal direction of the track rail is preferable. For example, there is a possible slide support member in which the track rail has a substantially rectangular section, ball running grooves are formed on both side surfaces of the track rail, and the moving block is formed in a saddle shape with guide grooves being loosely mated with a part of the track rail, and the track rail and the moving block are assembled together through a large number of balls.

In installing the track rails on the wall surface or the mounting plate, the longitudinal direction of the track rails may be aligned with horizontal direction. When the longitudinal direction of the track rails is not aligned with the horizontal direction, a lock mechanism for stopping the moving blocks on the track rails, for example, must be provided to prevent the track rails from slipping out of the moving blocks or to secure the object to be supported at a desired position on the wall surface.

In view of reducing the projection amount of the object to be supported from the wall surface as much as possible and further making the aesthetic appearance of the wall surface better, it is preferable to form accommodating grooves extending in the moving direction of the object to be supported in the wall surface to fix the whole slide support members each composed of a moving block and track rails in the accommodating grooves.

When the whole slide support members are received in the accommodating grooves and the track rails move over the moving blocks fixed on the wall surface, the accommodating grooves must be formed as long as the total length of the stroke of the track rail and the total length of the accommodating groove becomes larger than the total length of the track rail inevitably. Therefore, in view of minimizing the processing of the accommodating groove in the wall surface, it is preferable to form such a construction that part of the moving block should be mated with the accommodating groove and that the track rail assembled with the moving block should move along the surface of the wall surface without being buried in the wall surface.

DESCRIPTION OF SYMBOLS

1 . . . object to be supported, 3 . . . slide support member, 10 . . . mounting plate, 11 . . . track rail, 11a . . . bite preventing board, 20 . . . moving block, 30 . . . wall surface, 31 . . . accommodating groove, 32 . . . decorative curtain Best Mode for Carrying Out the Invention The wall-mounting structure of the present invention will be described in detail hereinafter with reference to the accompanying drawings.

Figure 1:
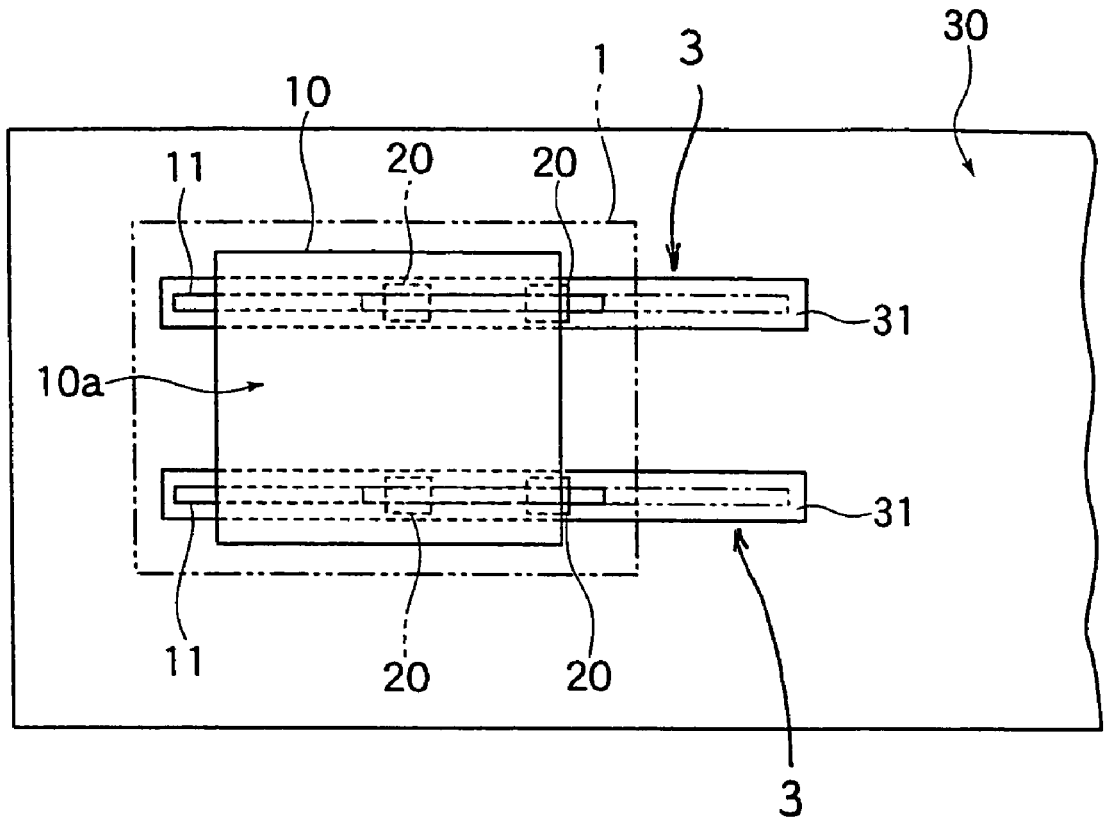
FIG. 1 A front view of a wall-mounting structure according to a first embodiment of the present invention.
Figure 2:
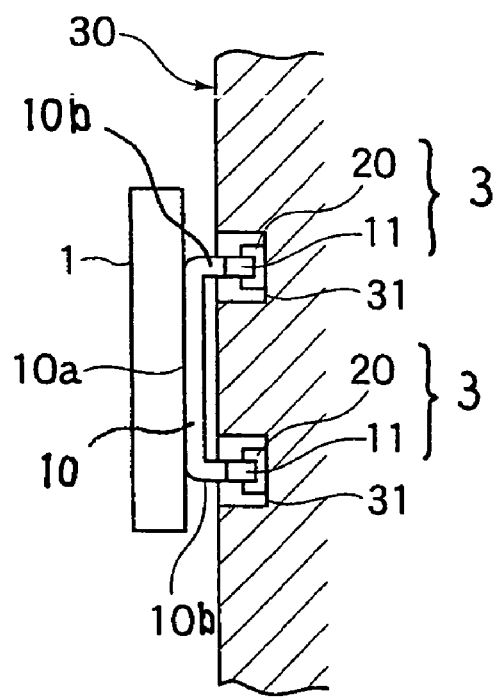
FIG. 2 A side view of the wall-mounting structure according to the first embodiment of the present invention.

FIG. 1 and FIG. 2 each show a wall-mounting structure according to a first embodiment of the present invention. This wall-mounting structure is adapted to mount a thin large-screen TV set as an object to be supported 1 on the wall surface 30 of a living room or the like, and includes a mounting plate 10 to which the object to be supported is fixed and slide support members 3 for movably supporting the mounting plate 10 on the wall surface 30.

The above mounting plate 10 is formed to be flat and has, on its surface, a fixing surface 10a for supporting the object to be supported 1 from the back thereof, and the object to be supported 1 is fixed by fixing means such as a screw or bolt. When the object to be supported 1 is, for example, a liquid crystal large-screen TV set, and it has a dedicated bracket to be fixed on the wall surface 30 as an accessory, the dedicated bracket is fixed to the fixing surface 10a of the mounting plate 10 by a screw or the like, and then the object to be supported 1 is mounted to the dedicated bracket.

Connecting arms 10b to be coupled to the slide support members 3 are protrusively formed on the rear of the mounting plate 10 so that the mounting plate 10 is held on the slide support members 3 by the connecting arms 10b. The connecting arms 10b may be formed by bending the peripheral portions of the mounting plate 10 or firmly fixed to the mounting plate 10 by welding, screwing or the like.

Each of the slide support members 3 is composed of a track rail 11 and moving blocks 20 which can freely move relative to each other. In the embodiment shown in FIG. 1 and FIG. 2, two slide support members 3 are used to hold the mounting plate 10 on the wall surface 30. In this embodiment, the track rail 11 is fixed to the connecting arm 10b of the mounting plate 10 whereas the moving blocks 20 are fixed on the wall surface 30, and the track rail 11 is arranged such that its longitudinal direction is aligned with the horizontal direction.

Figure 3:
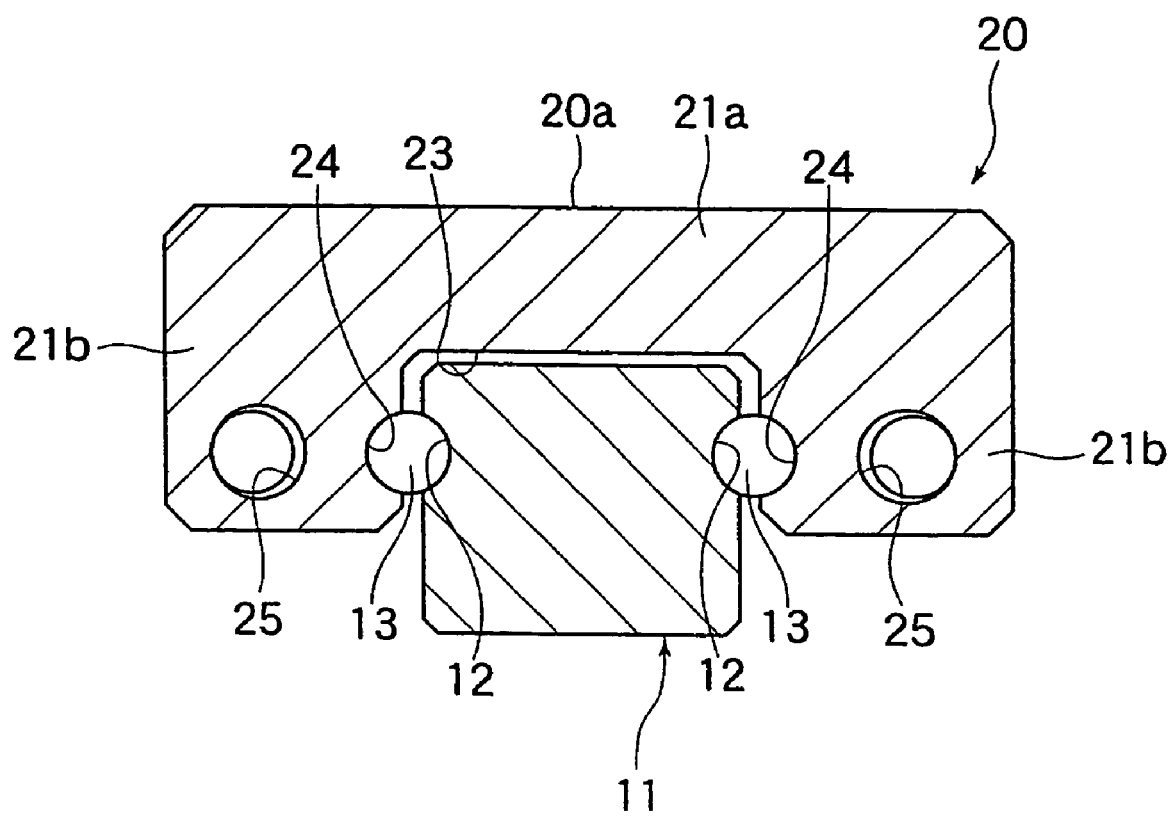
FIG. 3 A sectional front view of an example of a linear guide device which can be used as a slide support member.
Figure 4:
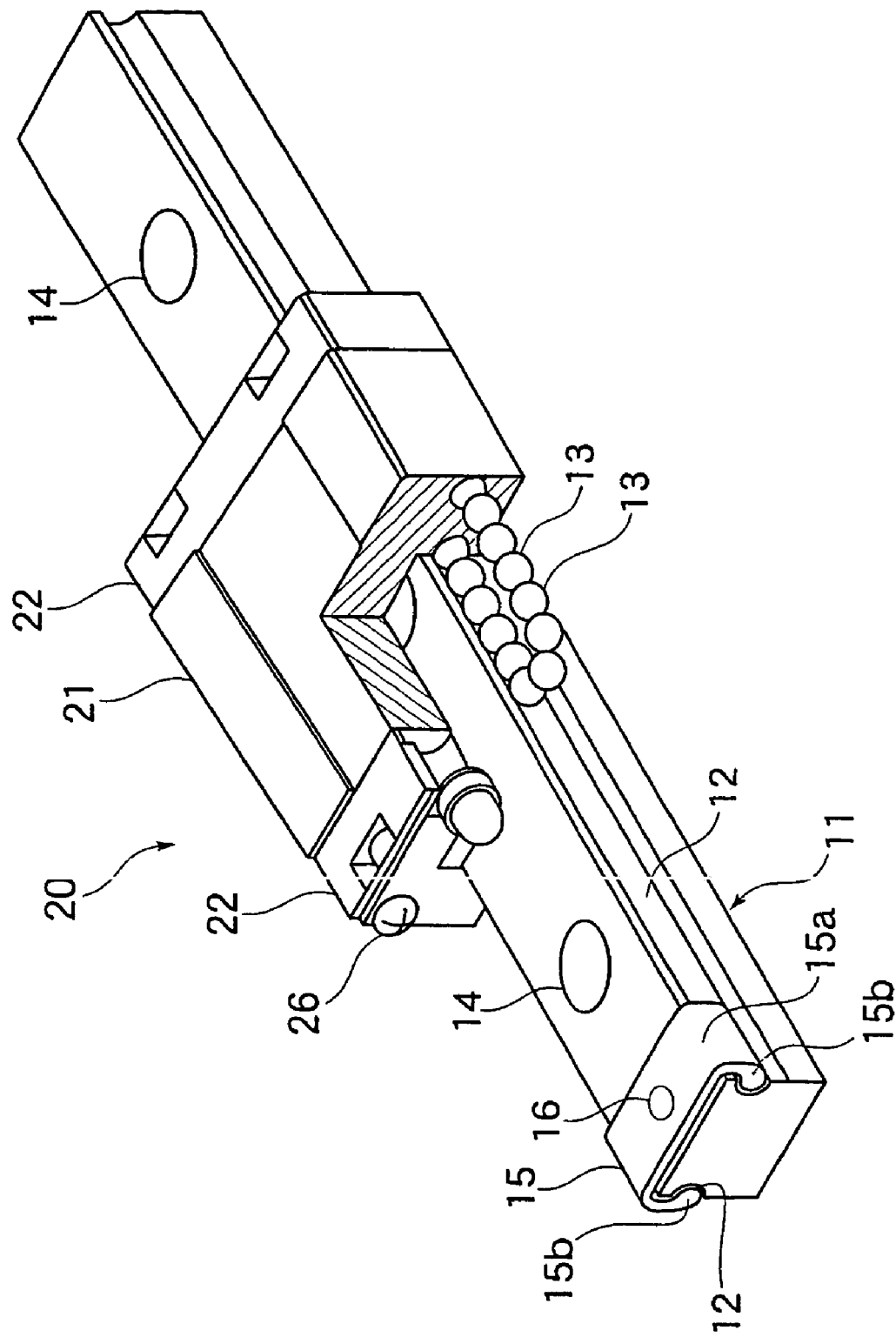
FIG. 4 A perspective view of the linear guide device shown in FIG. 3.

FIG. 3 and FIG. 4 each show an example of a linear guide device which can be used as the slide support member 3. This linear guide device includes a linear track rail 11 having ball rolling grooves 12 formed in its longitudinal direction and moving blocks 20 assembled with the track rail 11 through a large number of balls 13 as rolling elements and having endless circulation passages for the balls 13 therein. Along with the rolling of the balls 13, the moving block 20 can freely move along the track rail 11.

The track rail 11 has a substantially rectangular section viewed in a direction perpendicular to the longitudinal direction of the track rail and a ball rolling groove 12 is formed in both side surfaces of the track rail 11 in the longitudinal direction. Attachment through holes 14 extend through the track rail 11 at suitable intervals in the longitudinal direction so that the track rail 11 and the connecting arm 10b are firmly fixed together by fastening fixing bolts inserted into the through holes 14 to the connecting arm 10b of the mounting plate 10.

The moving block 20 is composed of a metal block body 21 having ball rolling grooves 24 opposed to the ball rolling grooves 12 of the track rail 11 and synthetic resin end plates 22 respectively fixed to the front and rear end surfaces of the block body 21. The block body 21 is composed of a proximal part 21a opposed to the top surface of the track rail 11 and a pair of skirt parts 21b opposed to the both side surfaces of the track rail 11 and extending from the proximal part 21a is formed into a saddle shape with a guide groove 23 defined by the proximal part 21a and the skirt parts 21b.

The ball rolling grooves 24 on the block body 21 side are formed on the respective inner side surfaces of the skirt parts 21b and opposed to the ball rolling grooves 12 of the track rail 11 to constitute load passages in which the balls 13 roll while applying a load. Ball return holes 25 are formed in the respective skirt parts 21b of the block body 21 in such a manner that the ball return holes are parallel to the ball rolling grooves 24 so that the balls 13 roll in the ball return holes 25 under no load.

Meanwhile, a U-shaped direction change passage through which the load passages communicate with the ball return holes 25 is formed in the respective end plates 22, and the pair of end plates 22 are fixed to the front and rear end surfaces of the block body 21 to form endless circulation passages in which the balls 13 circulate from the load passage via the direction change passage, the ball return hole, the direction change passage and again to the load passage. The end plates 22 are fixed to the block body 21 by attachment bolts 26.

The track rail 11 is assembled with the above moving block 20 in such a manner that the upper half of the track rail 11 is loosely mated with the guide groove 23 of the block body 21, and the balls 13 roll between the ball rolling groove 12 of the track rail 11 and the ball rolling groove 24 of the moving block 20 while applying a load. The ball rolling groove 12 of the track rail 11 and the ball rolling groove 24 of the moving block 20 have a Gothic arch-shaped section, and the balls 13 contact the ball rolling grooves 12 and 24 at two points, respectively. Therefore, the moving block 20 can move along the track rail 11 continuously in the longitudinal direction of the track rail 11 but separation between the moving block 20 and the track rail 11 is prevented in a direction perpendicular to the moving direction.

Since the moving block 20 is fixed on the wall surface 30 and the track rail 11 is fixed to the mounting plate 10 in this embodiment as described above, the track rail 11 can freely move with respect to the moving block 20. That is, the above mounting plate 10 is held on the wall surface 30 by the slide support members 3 and can move freely in the longitudinal (horizontal) direction together with the track rail 11. Since separation between the track rail 11 and the moving block 20 is prevented, even if vibration such as an earthquake is applied, the mounting plate 10 does not fall off from the wall surface 30 as far as the slide support members 3 are not broken.

To prevent the track rail 11 from falling off from the moving block 20, a stopper 15 is fixed to the both ends of the track rail 11. This stopper 15 is formed into a substantially U-shape configuration and has a plate part 15a corresponding to the top surface of the track rail 11 and a pair of foot parts 15b and 15b extending from the plate part 15a. The ends of the foot parts 15b are curved inward to enter the respective ball rolling grooves 12 formed on both side surfaces of the track rail 11. A tap through hole 16 is formed in the plate part 15a and a screw (not shown) for fixing the stopper 15 is threaded into the tap through hole 16. When the screw is threaded into the tape through hole 16 and the end of the screw is pressed against the top surface of the track rail 11, the entire stopper 15 is lifted from the track rail 11, the foot parts 15b are fitted in the ball rolling grooves 12 in such a manner that the stopper 15 embraces the track rail 11, and the stopper 15 is fixed on the track rail 11. When the end of the track rail 11 thus reaches the moving block 20 fixed on the wall surface 30, the stopper 15 abuts against the moving block 20 to thereby lock the movement of the track rail 11 and inhibit the further movement of the above mounting plate 10 in that direction.

In the embodiment shown in FIG. 1 and FIG. 2, two moving blocks 20 are assembled with each of the track rails 11. The number of the moving blocks 20 can be suitably changed depending on the weight of the object to be supported 1 on the mounting plate 10 and the withstand load of the wall surface 30. To increase the stroke of the track rail 11 with respect to the moving block 20, that is, the movable range of the mounting plate 10 with respect to the wall surface 30, the number of the moving blocks 20 for the track rail 11 is preferably one.

The above moving blocks 20 may be directly fixed on the wall surface 30. The slide support members 3 are interposed between the wall surface 30 and the mounting plate 10, so the projection amount of the mounting plate 10 from the wall surface 30 becomes larger, and the object to be supported 1 such as a TV set to be fixed on the mounting plate 10 further projects from the wall surface 30, which might impair the aesthetic appearance of the room interior. Therefore, as shown in FIG. 2, it is recommended to form accommodating grooves 31 in the wall surface 30 and to bury the slide support members 3 in the accommodating grooves 31.

The above accommodating grooves 31 are formed to have such a depth that the rack rails 11 do not project from the wall surface 30 with the slide support members 3 being fixed in the grooves 31, and the length in the horizontal direction of the accommodating grooves 31 is slightly larger than the stroke of the track rail 11 with respect to the moving blocks 20. The moving blocks 20 of the slide support members 3 are fixed in the accommodating grooves 31 so that the track rails 11 move in the horizontal direction in the accommodating grooves 31. The mounting plate 10 is connected to the track rails 11 in the accommodating grooves 31 by the connecting arms 10b.

Since the mounting plate 10 is thus situated in the vicinity of the wall surface 30, the projection amount of the object to be supported 1 fixed on the mounting plate 10 from the wall surface 30 can be reduced, thereby making it possible to maintain the aesthetic appearance of the room interior.

As the accommodating grooves 31 accommodate the track rails, the total length of each of the accommodating grooves is larger than the stroke range of the track rail. When the mounting plate is situated at one end of the movable range as shown in FIG. 1, the accommodating grooves formed in the wall surface are not hidden but exposed by the mounting plate, thereby impairing the aesthetic appearance of the room interior. Further, there arises a bad effect of dust accumulating in the accommodating grooves.

Figure 5:
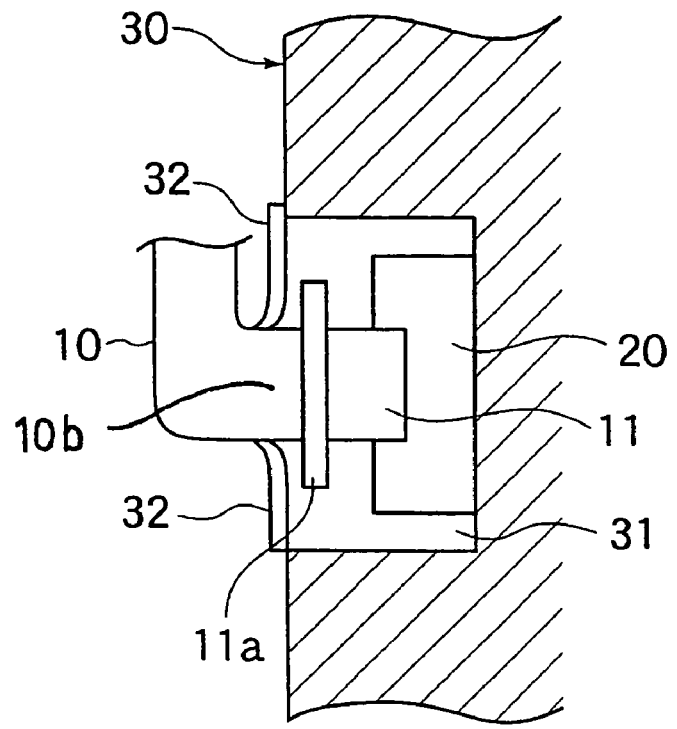
FIG. 5 An enlarged view showing a coupled state of the slide support member and a mounting plate according to the first embodiment.

Therefore, from the viewpoint of maintaining the aesthetic appearance, preferably, decorative curtains 32 for covering the accommodating groove 31 is provided and the connecting arm 10b for connecting the mounting plate 10 to the track rail 11 moves while pushing the decorative curtains 32 aside. The decorative curtains 32 are provided along the entire area in the longitudinal direction of the accommodating groove 31 to thereby cover an area corresponding to about half of the opening width from the both sides at the opening ends of the accommodating groove 31 as shown in FIG. 5. The decorative curtains 32 are made of a flexible material such as cloth or rubber so that the connecting arm 10b can move along a mating part of the two decorative curtains 32 smoothly, and preferably have the same color as that of the wall surface 30 so that they are assimilated to the wall surface 30.

Figure 6:
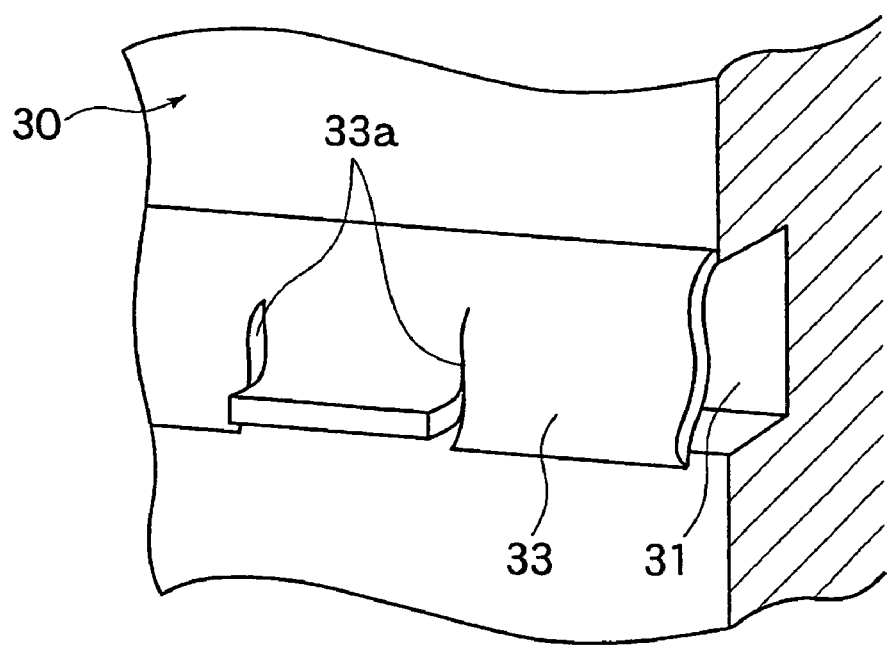
FIG. 6 A diagram showing an example of a decorative curtain provided in an opening of an accommodating groove.

The two decorative curtains 32 are not mated with each other at the center in the width direction of the accommodating groove but one decorative curtain 33 may be hung from the upper end of the accommodating groove 31 as shown in FIG. 6. In this case, slits 33a are formed at predetermined intervals in the longitudinal direction of the decorative curtain 33 so that the connecting arm 10b can move easily while pushing the decorative curtain 33 aside. Preferably, the decorative curtain 33 bends when being pushed aside by the connecting arm 10b in each section defined by the slits 33a. If those slits 33a are formed, only the decorative curtain 33 in contact with the connecting arm 10b is pushed aside, and thus the decorative curtain 33 in other area is not attached. As a result, the decorative curtain 33 of a part which is not covered by the mounting plate 10 is not bent despite the existence of the connecting arm 11a, thereby making it possible to attain the original object that the accommodating groove 31 is covered by the decorative curtain 33 so as not to impair the aesthetic appearance. When the decorative curtains 32 are provided on both sides in the width direction of the accommodating groove 31 and their ends meet at the center of the accommodating groove 31 as shown in FIG. 5, the end of the lower decorative curtain 32 may hang down after it is used for a long time. When one decorative curtain 33 is hung down from the upper end of the accommodating groove 31, the above inconvenience would not occur.

The end of the decorative curtain 32 pushed aside by the connecting arm 10b rolls toward the mounting plate 10 or the track rail 11. When it rolls toward the track rail 11, it is possible that the decorative curtain 32 may be bitten between the track rail 11 and the moving block 20. In view of this, to prevent the end of the decorative curtain 32 from being bitten between the track rail 11 and the moving block 20, the connecting arm 10b is provided with a collar-like bite preventing board 11a. As shown in FIG. 5, this bite preventing board 11a is provided on the connecting arm 10b and situated between a part in contact with the decorative curtain 32 and a connection part with the track rail 11 of the connecting arm 10b. As a result, even if the end of the decorative curtain 32 pushed aside by the connecting arm 10b rolls toward the track rail 11, the end of the decorative curtain 32 is locked by the bite preventing board 11a, thereby making it possible to prevent such a trouble that the decorative curtain 32 is bitten between the track rail 11 and the moving block 20.

Thus, the wall-mounting structure shown in FIG. 1 and FIG. 2 makes it possible to move the object to be supported 1 on the wall surface 30 in the horizontal direction and set it at a desired position without impairing the appearance of the wall surface 30.

However, the accommodating grooves for accommodating the entire slide support member must be formed in the wall surface in the wall-mounting structure shown in FIG. 1 and FIG. 2 according to the stroke range of the track rail, so it is troublesome to form such wall-mounting structure.

Figure 7:
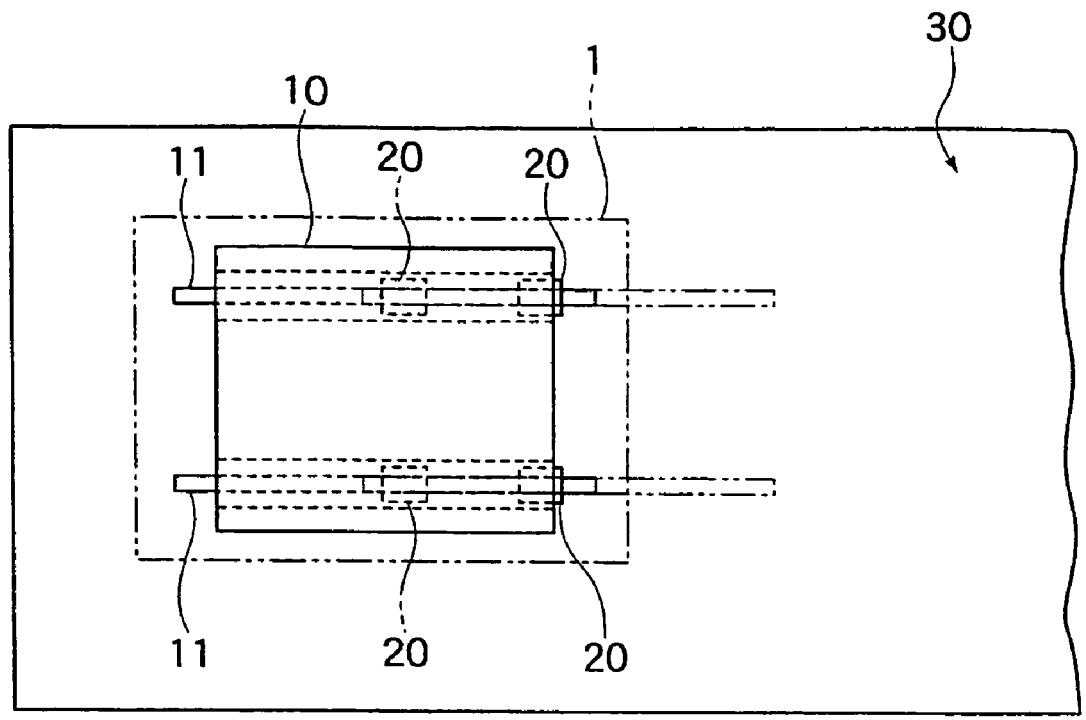
FIG. 7 A front view of the wall-mounting structure according to a second embodiment of the present invention.
Figure 8:
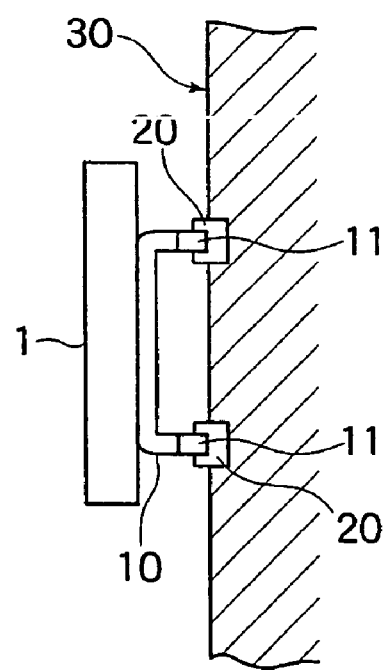
FIG. 8 A side view of the wall-mounting structure according to the second embodiment.

FIG. 7 and FIG. 8 each show a second embodiment of the present invention in consideration of this.

The constitutions of the mounting plate 10 and the slide support members 3 are the same as those of the first embodiment, except that the entire slide support member 3 is not accommodated in the accommodating groove 31 of the wall surface 30 but only the proximal part 21a of the moving block 20 is buried in the wall surface 30. The depth required for burying the proximal part 21a of the moving block 20 may be such that a space is formed between the track rail 11 assembled with the moving block 20 and the wall surface 30, and the track rail 11 can move freely over the wall surface 30, while being guided by the moving block 20.

With this constitution, the track rail 11 is formed to have such a length that the track rail 11 does not project from the rear surface of the object to be supported 1 and does not get out of the moving block 20. In addition, only the accommodating grooves large enough to receive the moving blocks 20 are formed in the wall surface 30. As a result, even if the mounting plate 10 with the object to be supported 1 fixed is moved to a desired position in the horizontal direction, the slide support member 3 composed of the track rail 11 and the moving blocks 20 is not recognized visually and no trace of processing the wall surface 30 is recognized. That is, the object to be supported 1 can be movably held on the wall surface 30 without impairing the aesthetic appearance of the wall surface 30.

According to this second embodiment, it is not necessary to form the accommodating grooves 31 as long as the stroke length of the track rail 11 in the wall surface 30 nor to provide the decorative curtains 32 for covering the accommodating grooves 31, so labor and time required for processing the wall surface 30 can be greatly cut.

Figure 9:
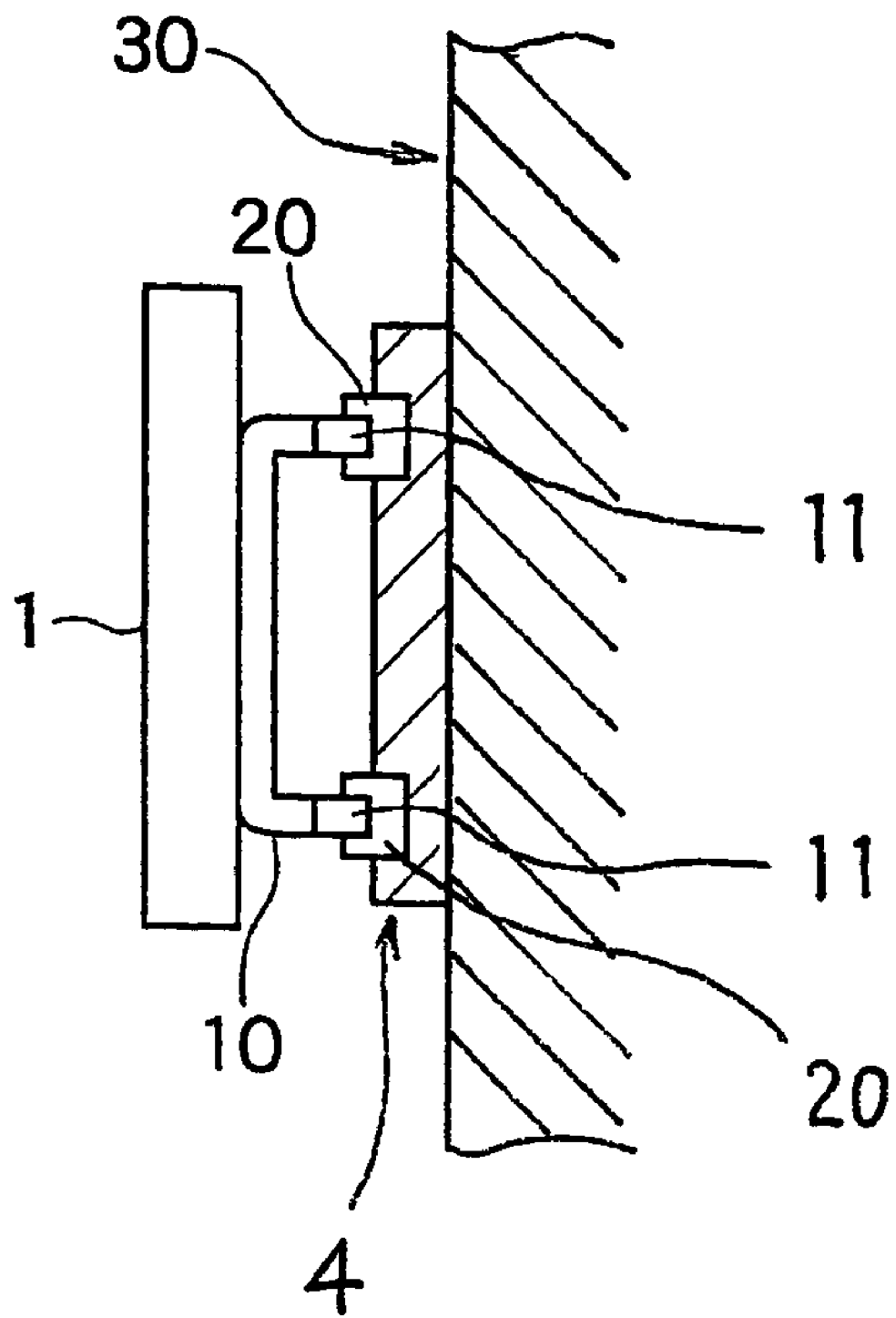
FIG. 9 A side view of the wall-mounting structure according to a third embodiment of the present invention.

FIG. 9 shows a wall-mounting structure according to a third embodiment of the present invention.

In the embodiments shown in FIG. 1 and FIG. 7, the slide support members 3 are directly fixed on the wall surface 30. It takes much labor and time to actually form the accommodating grooves 31 in the wall surface of the room. Further, when two slide support members 3 are used, the moving blocks 20 must be fixed on the wall surface 30 so that two track rails 11 become parallel to each other and it is troublesome to carry out this adjusting and fixing work at a construction site.

Therefore, from the above point of view, as shown in FIG. 9, it is preferred that a base member 4 to which the moving blocks 20 of the slide support members 3 are fixed should be provided and fixed on the wall surface 30. Only the proximal ends 21a of the moving blocks 20 are buried in the base member 4 as in the embodiment shown in FIG. 8 so that the track rails 11 guided by the moving blocks 20 can move over the surface of the base member 4. The base member 4 may be composed of a synthetic resin or metal plate as long as the attachment accuracy of the moving blocks 20 can be ensured to a certain degree, and accommodating grooves to be mated with the proximal parts 21a of the moving blocks 20 are formed in the base member 4 in advance. Thus, simply by mating the proximal parts 21a of the moving blocks 20 with the accommodating grooves, the parallelism of the two track rails 11 can be ensured. Only by fixing the base member 4 on the wall surface 30, the need to form the accommodating grooves in the wall surface 30 can be eliminated, and the construction time in the room where the wall-mounting structure is actually used can be minimized.

In the above embodiments, the track rails 11 are fixed on the rear side of the mounting plate 10 and the moving blocks are fixed on the wall surface. The track rails may also be fixed on the wall surface and the moving blocks may be fixed on the rear side of the mounting plate.

The invention claimed is:

1. A wall-mounting structure for supporting an object to be supported on the wall surface of a room, comprising:
   a mounting plate to which an object to be supported is fixed;
   accommodating grooves extending in the moving direction of the object to be supported are formed in the wall surface, and
   slide support members for movably supporting the mounting plate on the wall surface, wherein
   the slide support members are buried in the accommodating grooves,
   each of the slide support members is composed of a track rail and moving blocks which can move along the track rail,
   the track rail of the slide support member has a substantially rectangular section and ball rolling surfaces formed on both side surfaces of the track rail, while each of the moving blocks is formed in a saddle shape with a guide groove being loosely mated with a part of the track rail and assembled with the track rail through a large number of balls,
   the mounting plate is coupled to the track rails or the moving blocks of the slide support members by connecting arms; and
   a decorative curtain for covering the slide support members fixed in the accommodating groove is provided at the opening of the accommodating groove.

2. A wall-mounting structure according to claim 1, characterized in that slits are formed in the decorative curtain at predetermined intervals in the longitudinal direction of the accommodating groove.

3. A wall-mounting structure according to claim 1, characterized in that each of the connecting arms is provided with a collar bite preventing board between a contact portion with the decorative curtain thereof and a coupling portion with the slide support member thereof.

* * * * *